UNITED STATES PATENT OFFICE.

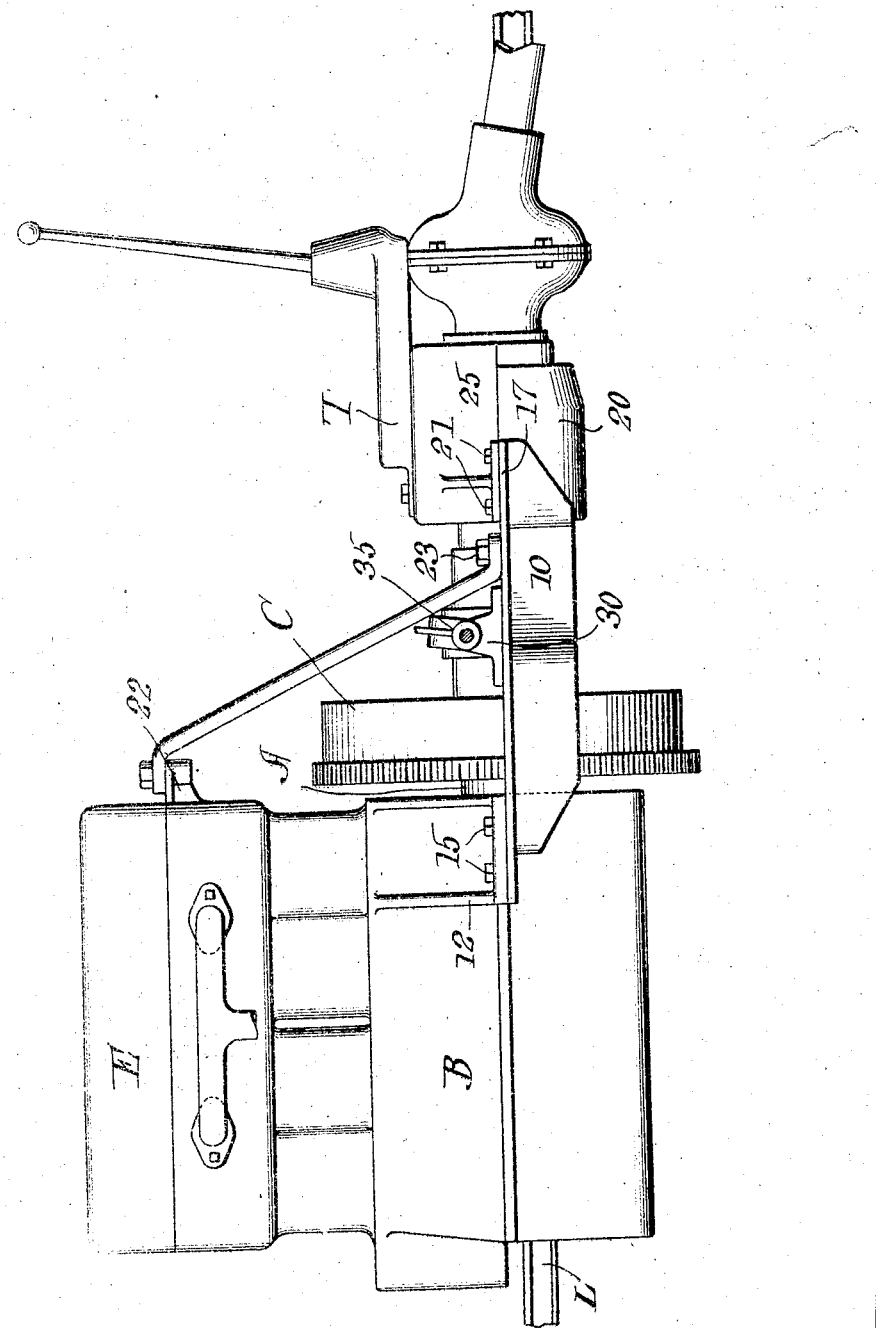

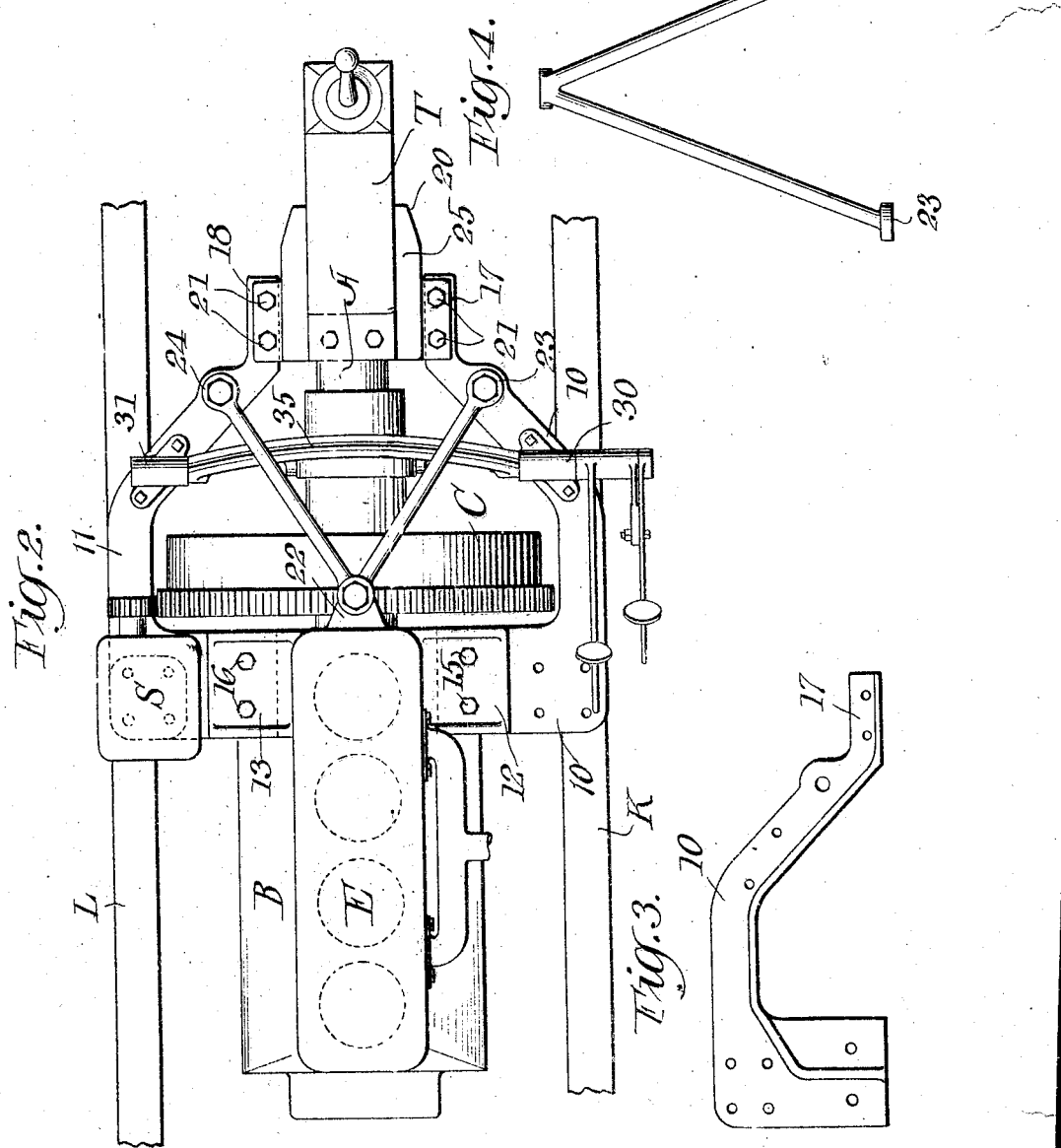

ARTHUR C. MASON, OF FLINT, MICHIGAN, ASSIGNOR, BY MESNE ASSIGNMENTS, TO CHEVROLET MOTOR COMPANY, A CORPORATION OF DELAWARE.

UNIT POWER PLANT FOR MOTOR-VEHICLES.

1,209,985.  Specification of Letters Patent. Patented Dec. 26, 1916.

Application filed August 14, 1915. Serial No. 45,589.

*To all whom it may concern:*

Be it known that I, ARTHUR C. MASON, a citizen of the United States, and a resident of the city of Flint, county of Genesee, and State of Michigan, have invented certain new and useful Improvements in Unit Power Plants for Motor-Vehicles, of which the following is a full, clear, and exact description.

One of the objects of my invention is to provide a structure by means of which the several elements which go to make up an automobile power plant, can be readily assembled and disassembled.

Another object is to form a composite supporting frame, so that the central portion of the frame will serve as a supporting means for the other portions.

Other objects will appear from the following description and claims.

The invention consists in combining the various elements of a motor vehicle power plant in such relation to each other that they may be easily assembled and disassembled and in such manner that the separate elements may be removed without materially disturbing the other elements thereof. Briefly this power plant comprises an engine, transmission, fly wheels and universal joints, the transmission being supported by removable brakes which are secured to the engine proper. The parts supporting the transmission also support the clutch and brake operating mechanism, all of which will be clearly understood from the following description taken in connection with the accompanying drawings in which similar reference characters refer to similar parts in the several views.

Figure 1 is a side elevation of my improved unit power plant. Fig. 2 is a plan view thereof. Fig. 3 is an inverted plan view of one of the side and central supporting parts. Fig. 4 is an end elevation of the truss frame.

Referring to Figs. 1 and 2, E represents the engine, C the clutch mechanism and T the transmission. The supporting frame comprises two parts 10 and 11 arranged on either side of the engine shaft A. These parts are secured respectively by any suitable means to the sides K and L of the chassis. Brackets 12 and 13, preferably integral with the crank case B of the engine extend at right angles to the vertical sides of the engine and these brackets are secured by bolts 15 and 16 to the inner arms of the supporting brackets 10 and 11. Similarly on the oppositely disposed arms 17 and 18 of the supporting brackets 10 and 11 and secured by bolts 21 is the housing 25 for the transmission 20. A V-shaped truss is secured at its apex by a suitable bolt to a bracket 22 integral with the engine and at its extremities 23 and 24 it is similarly secured to the supporting brackets 10 and 11. The rocking member 35 attached to operate the clutch is journaled in brackets 30 and 31 which are secured to the supporting members 10 and 11. On one side of the central supporting frame is provided means for removably securing the self-starter S.

From the above description, it will be seen that my invention comprises a power plant of novel design and arrangement and the parts are so arranged that the various elements may be easily removed for repair or adjustment without materially disturbing the general arrangement of the other parts, while at the same time when completely assembled, the supporting brackets and truss frame form a rigid and efficient support for the transmission and clutch operating mechanism.

Having now described my invention, what I claim as new and desire to secure by Letters Patent, is:—

1. In an automobile, a supporting frame consisting of a plurality of parts, a center frame consisting of two parts one upon each side of the engine each of which is removably supported upon the chassis.

2. In an automobile, a supporting frame consisting of a plurality of parts, a center frame consisting of two separate parts one upon each side of the engine, each of which is removably supported upon the chassis and a V-shaped strut removably secured at its apex to the upper part of the engine frame and removably secured at the extremities of its supporting arms respectively to the parts forming the center frame.

3. In an automobile, a supporting frame consisting of a plurality of parts, a center frame consisting of two separate parts, one upon each side of the engine, each of which is movably supported upon the chassis and a strut removably secured to the engine and to the center frame.

4. In an automobile, a supporting frame consisting of a plurality of parts, a center frame consisting of two separate side parts each of which is removably supported upon the chassis, and a self starter removably secured to one of the side central frames.

In witness whereof I have hereunto set my hand at the borough of Manhattan, city, and State of New York, this fifth day of August, 1915.

ARTHUR C. MASON.

In presence of—
ETHEL D. BARON,
JOHN J. RANAGAN.